March 25, 1958        K. HEINRICH        2,828,230
VERTICAL COUNTER-CURRENT EXTRACTING TOWER
Filed March 4, 1953        6 Sheets-Sheet 1
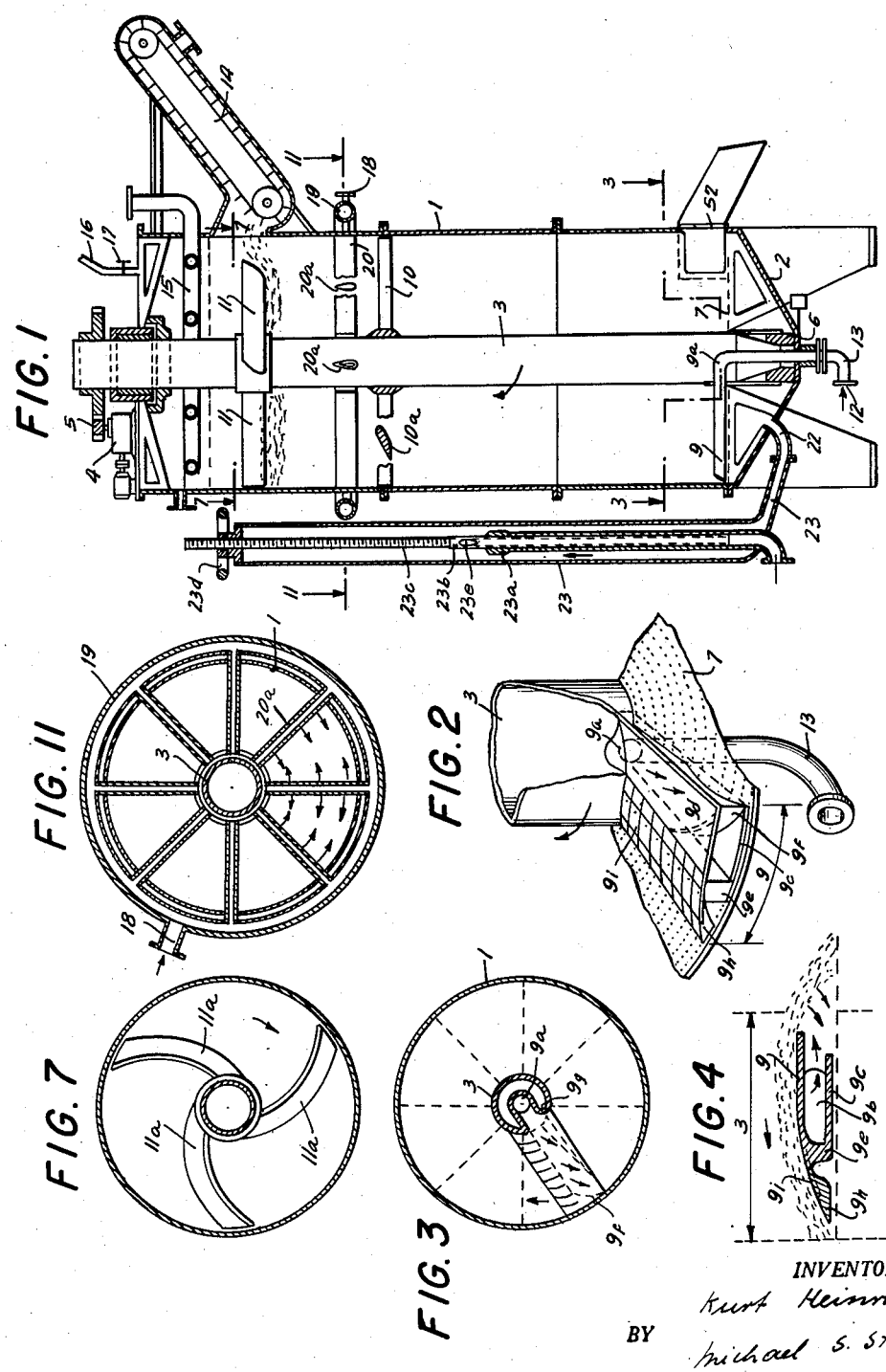
INVENTOR.
Kurt Heinrich
BY Michael S. Striker

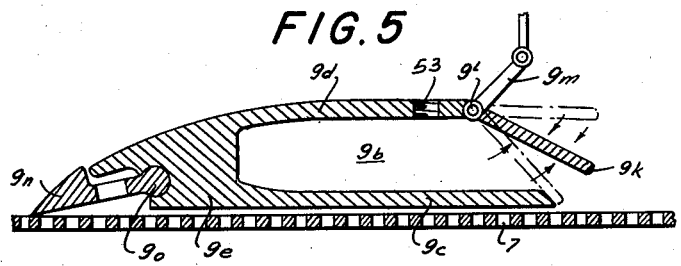
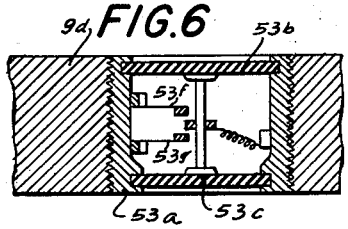
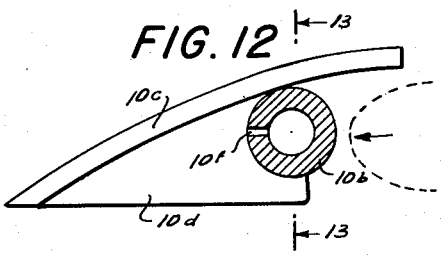
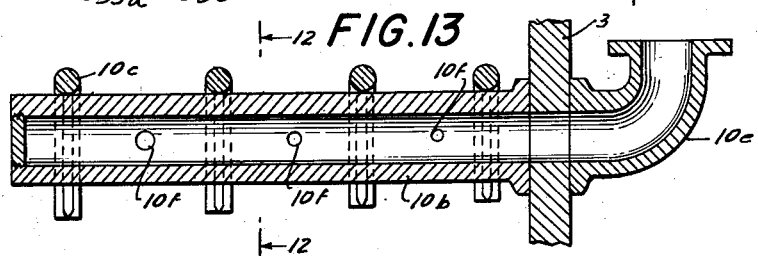
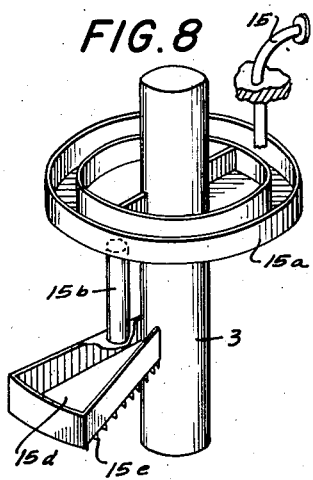
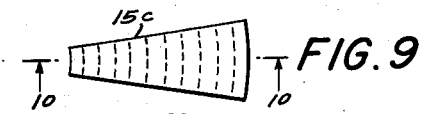
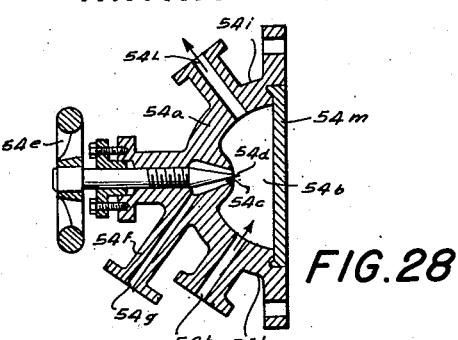

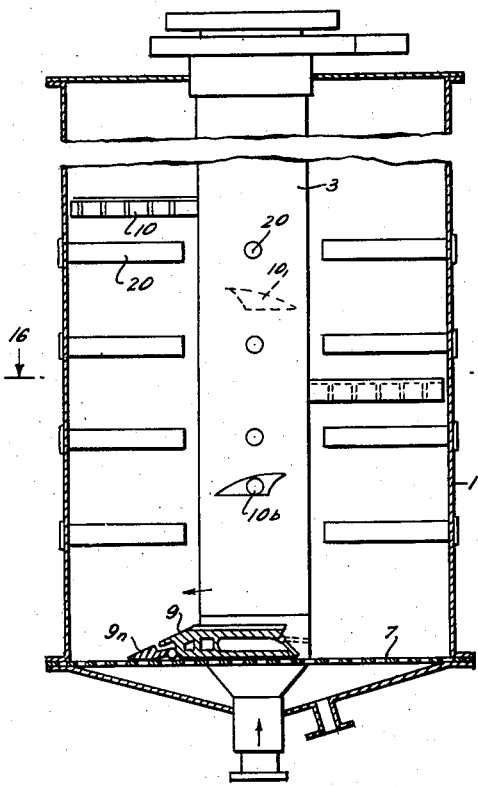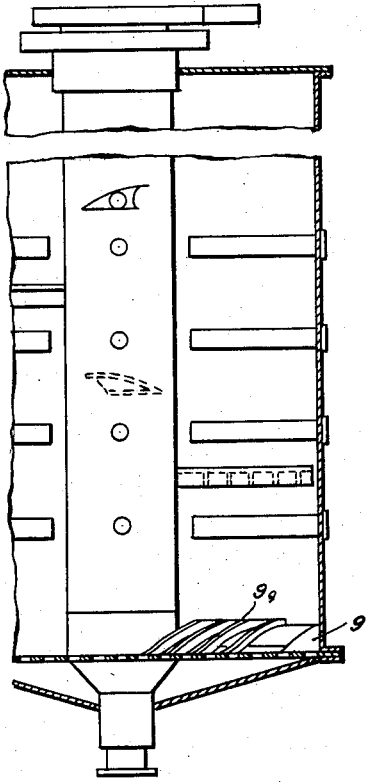

March 25, 1958 K. HEINRICH 2,828,230
VERTICAL COUNTER-CURRENT EXTRACTING TOWER
Filed March 4, 1953 6 Sheets-Sheet 4
FIG. 18
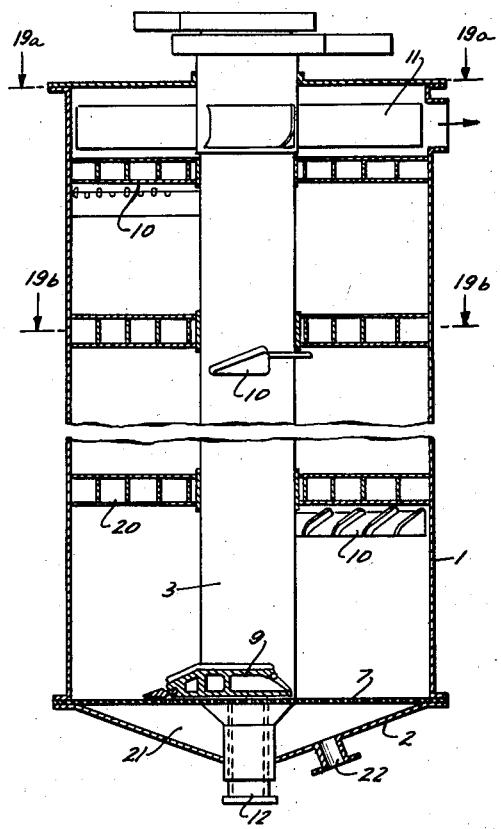
FIG. 21
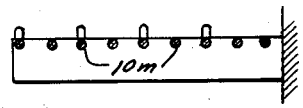
FIG. 22
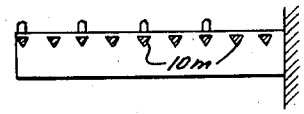
FIG. 23
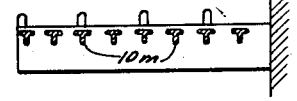
FIG. 24
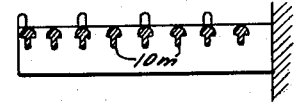
FIG. 19a
FIG. 19b
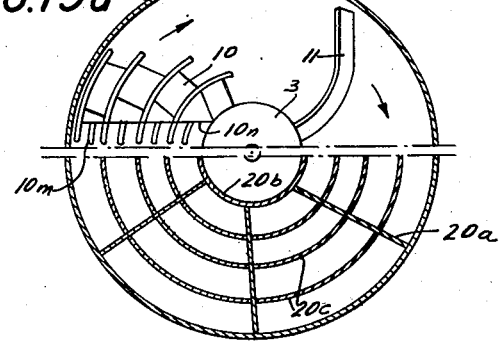
FIG. 20
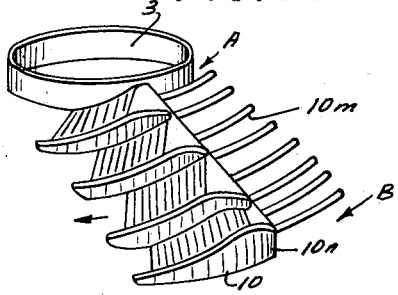
INVENTOR.
Kurt Heinrich
BY Michael S. Striker

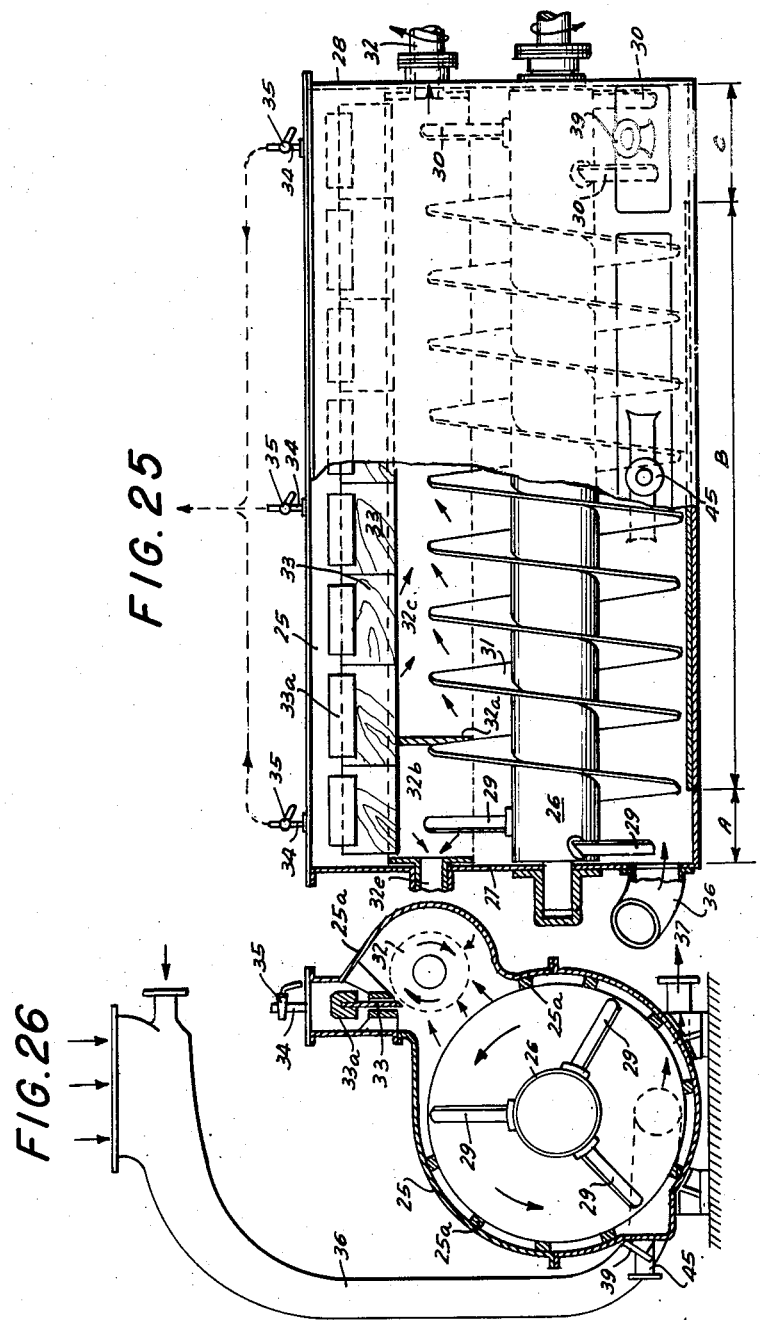

March 25, 1958     K. HEINRICH     2,828,230
VERTICAL COUNTER-CURRENT EXTRACTING TOWER Filed March 4, 1953     6 Sheets-Sheet 6

INVENTOR.
Kurt Heinrich
BY Michael S. Striker

United States Patent Office 2,828,230
Patented Mar. 25, 1958

2,828,230

VERTICAL COUNTER-CURRENT EXTRACTING TOWER

Kurt Heinrich, Grevenbroich, Germany

Application March 4, 1953, Serial No. 340,285

Claims priority, application Germany January 3, 1952

14 Claims. (Cl. 127—7)

The present invention relates to a juice extracting process and apparatus for practising the same.

More particularly, the present invention relates to a process and apparatus of the type which are adapted to be used in the sugar industry for deriving sugar from beet pulp or the like.

This application is a continuation-in-part of the application Serial No. 329,663, filed January 5, 1953, and entitled "Continuing Extracting Apparatus."

There are several disadvantages in known processes and apparatus of this type. For example, there is always a considerable amount of sugar which remains in the pulp and is not extracted therefrom by the known processes and apparatus. Moreover, the beet pulp does not move uniformly in the known processes and apparatus so that all of the beet pulp is not treated in exactly the same way, which obviously is undesirable.

One of the objects of the present invention is to overcome these disadvantages by providing a process and apparatus according to which more sugar is extracted from the pulp than has hitherto been possible.

It is another object of the present invention to provide a process and apparatus capable of moving a beet pulp or the like through an extracting tower in a substantially vertical direction and without the use of any worm or similar apparatus which might cause the pulp to move upwardly at different rates and which might cause more of the pulp to be concentrated at the outer walls of the tower.

A further object of the present invention is to provide an intimate mingling of the pulp in the extraction tower with a liquid therein while at the same time restricting the pulp to a substantially vertical movement upwardly through the tower.

An additional object of the present invention is to provide a process and apparatus for distributing the pulp to the extracting tower in a layer which has a uniform depth and a uniform pulp content.

A still further object of the present invention is to provide an apparatus and process for bringing a pulp mash to a state of plasmolysis in a heating vat just before the pulp mash is transferred from the vat to the extracting tower.

Yet another object of the present invention is to provide means for continuously cleaning sieves used in the apparatus of the invention.

A still another object of the present invention is to provide a means for regulating the pressure with which the pulp is introduced to the juice extracting tower so that this pressure is greater than the pressure of the column of pulp in the tower but not great enough to cause the introduced pulp to break into the column of mash.

Yet another object of the present invention is to provide a means for efficiently ejecting the treated pulp from the extraction tower.

A still additional object of the present invention is to provide a juice extracting tower which is very easy to empty and clean.

Yet another object of the present invention is to provide hand and automatic controls for the process and apparatus of the invention which provide a convenient and accurate regulation of the juice extracting process.

It is also an object of the present invention to provide a means for vibrating the mash in the tower.

It is a further object of the present invention to provide a process and apparatus for circulating liquids through the pulp in the heating vat in a direction transverse to the movement thereof.

The objects of the present invention also include the provision of a process and apparatus for recirculating a liquid a plurality of times through a pulp moving through a heating vat so that the liquid becomes more and more enriched with juices from the pulp until the liquid is finally withdrawn as raw juice.

Also, the objects of the present invention include a process and apparatus for introducing a liquid of high juice content into the heating vat together with the fresh pulp and withdrawing this liquid from the vat with a still further enriched juice content.

With the above objects in view, the present invention mainly consists of a process for extracting juices from fruits or vegetables, this process including the steps of raising a pulp mash of the material from which juice is to be extracted upwardly along an extraction tower, simultaneously moving a liquid downwardly along the tower to extract juices from the mash, and simultaneously moving a fresh supply of pulp mash from a heating vat in a state of plasmolysis into the tower beneath the column of mash therein onto a sieve through which the liquid passes and at a pressure greater than that of the column of mash but too small to cause the fresh supply of mash to break into the column of mash thereover. This pulp which is introduced to the tower is treated in a heating vat according to a process which includes the steps of moving the pulp through a closed heating vat by means of a rotating worm, while maintaining the spaces between the thread turns of the worm substantially filled with the pulp, simultaneously introducing into the heating vat liquids respectively carrying the extracted juice in different concentrations, moving the thus introduced juices through the pulp transversely to the direction of movement thereof and through a sieve into a chamber formed by the sieve, extending along the length of the vat and being separated therefrom by the sieve, and continuously cleaning the sieve through which the liquid moves.

Also with the above objects in view, the present invention mainly consists of an extracting tower for extracting juices from fruits or vegetables, this tower including an elongated cylindrical hollow body having a top end portion toward which a pulp mash of the material from which juices are to be extracted is adapted to move. A sieve is located in the cylindrical body adjacent the bottom thereof and extending transversely to the axis thereof. An elongated hollow shaft is mounted for rotation about its own axis in the cylindrical body, this shaft axis coinciding with the axis of the cylindrical body. A drive means is connected to the shaft to rotate the same, and a mash distributing means is fixed to the shaft for rotation therewith, is located directly over the sieve and has a front edge portion of substantially wedge-shaped cross section engaging the sieve to clean the same. A plurality of first arms extend substantially radially from the shaft, are fixed thereto, and are located at a predetermined elevation in the cylindrical body over the distributing means to move through a mash at the elevation of these first arms during rotation of the shaft, and a plurality of second arms are located in the cylindrical body at a predetermined elevation over the first arms, these second arms extending substantially radially toward the shaft axis, and being fixed to and stationary with the cylindrical body to prevent rotation of the mash column therein.

The pulp for this tower is derived from a heating vat which includes an elongated horizontally extending closed vat housing and a elongated worm extending horizontally through the housing and being turnable therein. An inlet communicates with one end of the vat housing for supplying a fresh pulp mash to the worm to be moved by the latter to the opposite end of the vat housing and an outlet is connected to this opposite end of the vat housing for conveying the pulp mash from the latter. A cylindrical sieve extends along the length of the vat housing in the interior thereof and is located adjacent an upper portion thereof, this sieve being engaged by a scraper means which continually cleans the sieve, and a partition means is located in the cylindrical sieve to divide it into at least two chambers one of which is located adjacent the said one end of the vat housing and the other of which extends from the partition means to the opposite end of the vat housing. A pump means is connected to this other chamber for drawing liquid therefrom, and a first conduit means leads from the pump means to an intermediate portion of the vat for conveying liquid from the pump means back into the vat. A second conduit means leads to a portion of the vat housing adjacent the opposite end thereof for supplying liquid to the interior thereof to pass to the other sieve chamber formed by the partition means and to be drawn by the pump means into the first conduit means, and a third conduit means leads from the pump means to the inlet of the vat housing for supplying a liquid thereto. Also, a duct means leads from the said one chamber of the cylindrical sieve to convey the raw juice therefrom.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a vertical, partly sectional, elevational view of a juice extracting tower constructed in accordance with the present invention;

Fig. 2 is a fragmentary perspective view of a mash distributor located in the tower of Fig. 1 and shows parts associated therewith;

Fig. 3 is a sectional view taken along line 3—3 of Fig. 1 in the direction of the arrows;

Fig. 4 is a transverse sectional view of the mash distributor of Fig. 3 illustrating the operation thereof;

Fig. 5 is a transverse sectional view of a different embodiment of a mash distributor and a sieve located thereunder;

Fig. 6 illustrates, in an enlarged transverse sectional view, a control apparatus located on the distributor of Fig. 5;

Fig. 7 is a sectional view taken along line 7—7 of Fig. 1 in the direction of the arrows;

Fig. 8 is a fragmentary perspective view of a liquid distributing means for the tower of Fig. 1;

Fig. 9 is a plan view of the sector shaped box of Fig. 8;

Fig. 10 is a sectional view taken along line 10—10 of Fig. 9 in the direction of the arrows;

Fig. 11 is a sectional view taken along line 11—11 of Fig. 1 in the direction of the arrows;

Fig. 12 is a sectional view of a turning arm of the tower of Fig. 1 and is taken along line 12—12 of Fig. 13 in the direction of the arrows;

Fig. 13 is a sectional view taken along line 13—13 of Fig. 12 in the direction of the arrows;

Fig. 14 is a sectional elevational schematic view of a juice extracting tower having a construction different from that of Fig. 1;

Fig. 15 is a fragmentary schematic elevational view of the tower of Fig. 14 and illustrating a mash distributor in perspective;

Fig. 16 is a sectional plan view taken along line 16—16 of Fig. 14 in the direction of the arrows;

Fig. 17 is a fragmentary perspective view of a turning arm of Fig. 16 and parts associated therewith;

Fig. 18 is an elevational, sectional schematic view of a juice extracting tower having a different type of turning arm arrangement;

Fig. 19a is a transverse sectional plan view of the structure of Fig. 18;

Fig. 19b is a sectional plan view taken along line 19b—19b of Fig. 18 in the direction of the arrows;

Fig. 20 is a perspective view of a turning arm of Figs. 18 and 19;

Figs. 21-24 are fragmentary sectional views taken along line A—B of Fig. 20 and respectively illustrating four different cross sections for the rearwardly extending rods of Fig. 20;

Fig. 25 is a partly sectional longitudinal front view of a heating vat constructed in accordance with the present invention;

Fig. 26 is a partly sectional transverse elevational view of the heating vat of Fig. 25;

Fig. 28 is a transverse sectional view of a vibration producing apparatus constructed in accordance with the present invention.

Figure 27:
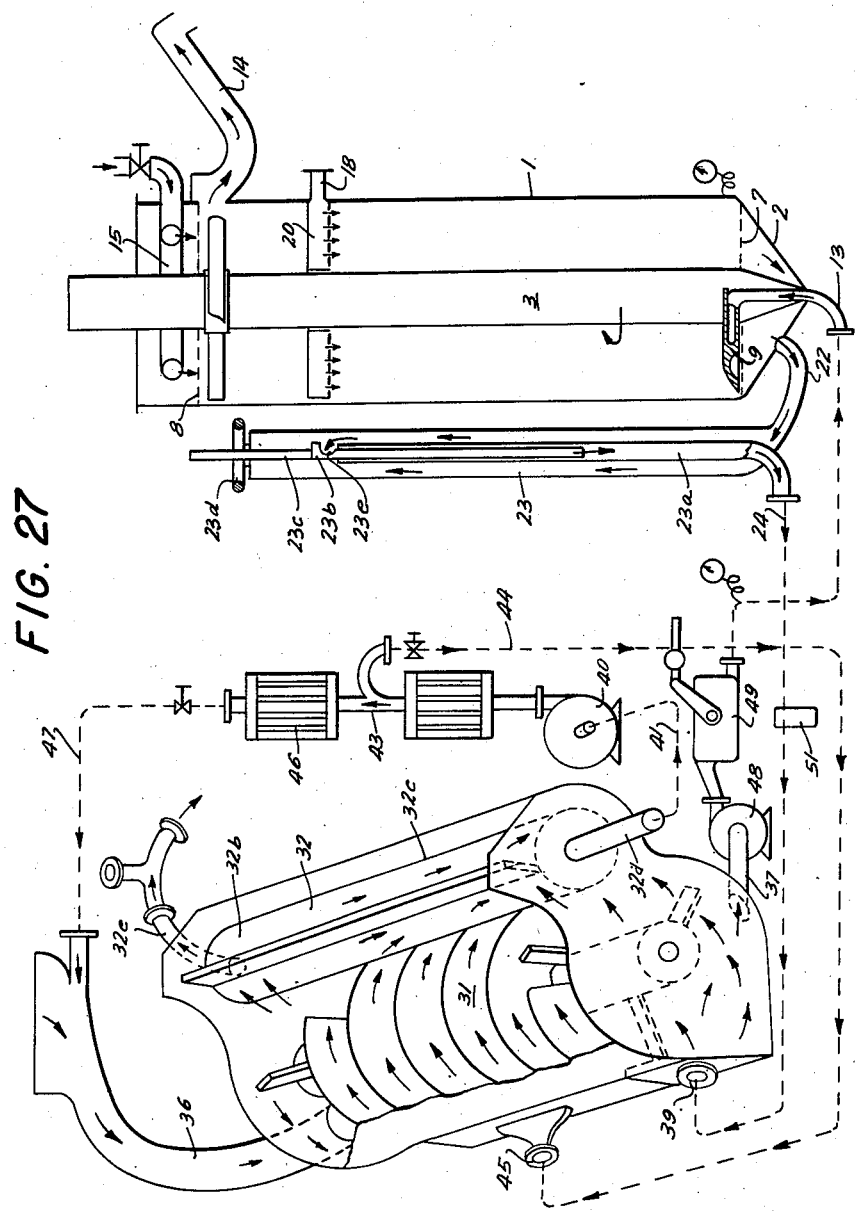
Fig. 27 is a schematic illustration of the process according to the invention and also schematically illustrates how the entire apparatus is connected together.

Referring now to the drawings, it will be seen that the juice extracting tower of Fig. 1 includes a vertically extending hollow cylindrical body 1 which is closed at its bottom by the conical floor member 2. A hollow shaft 3 is located within the tower formed by the cylindrical hollow body 1, and the axis of the shaft 3 coincides with that of the cylindrical body 1. The shaft 3 is connected by the gear train 5 to the motor 4 located on top of the tower to be turned about its axis by this motor, and the shaft 3 is turnably carried by the annular bearing 6 located at the bottom of the tower. This turning shaft 3 serves to rotate the mash distributing means 9 connected thereto, as well as the stirring arms 10 and ejector arms 11 connected thereto. The space just above the conical floor 2 is separated from the rest of the tower by a perforated plate 7 forming a bottom sieve for the tower, and a second sieve 8 of a similar construction is located about the shaft 3 and extends across the tower adjacent the top thereof to determine the highest level to which the pulp mash in the tower can move.

The pulp mash is introduced at 12 into the lower part of the tower through the pipe 13 which is stationary and which is maintained in slidable sealing engagement with the pipe 9a extending along the turning axis of shaft 3 and being bent at its top portion where it is connected to the shaft 3 for rotation therewith and where it opens into the space 9b of the pulp distributor 9. The latter is connected to the shaft 3 for rotation therewith and is provided with a bottom wall 9c sliding over the top face of sieve 7 and with a top wall 9d located over the wall 9c in spaced relation thereto, as is evident from Figs. 2–4, the distributor 9 having a free open rear end located between these top and bottom walls 9c and 9b. These top and bottom walls are united at their forward ends by a wall 9e of the distributor which extends radially from the shaft 3, so that the space between these top and bottom walls is closed at its front end, the rear opening serving as an escape passage for the pulp which moves through this rear opening from the distributor onto the sieve 7. This space between the top and bottom walls 9d and 9c is limited toward its outer end by a curved vertical wall member 9f which is tangent to the wall of the cylindrical body 1, and at its inner side this space is limited by a vertically extending inner side wall 9g extending between pipe 9a and shaft 3 and being curved so as to be tangent to the latter, as is evident from Fig. 3.

The described form of the walls defining the space 9b through which the pulp moves into the tower produces a uniform flow of the pulp mash along the entire length of the space 9b and deposits the pulp mash onto the sieve 7 not only in a layer of uniform height, but also in a layer which has a uniform pulp content, so that this pulp content does not vary at different parts of the layer of pulp mash. It is important that when the pulp mash moves off from the bottom wall 9c onto the sieve 7 the liquid located between the pulp particles should be free to fall through the sieve 7 so that the remaining pulp forms a layer of uniform height extending radially across the sieve 7. This result can be obtained in different ways. According to Figs. 2–4, the trailing edge of the bottom wall 9c has a particular curvature. This curvature may be determined experimentally simply by trial and error by introducing into the tower a quantity of carrot pulp which will be easily recognizable by its distinctive color. When the trailing edge of bottom wall 9c is properly curved, the layer of carrot pulp will move as a body upwardly through the tower and will be seen leaving the tower as a continuous quantity of pulp which is not mixed with the remaining pulp in the tower. The result of giving the trailing edge of bottom wall 9c this curvature and of extending the top wall 9d rearwardly beyond the bottom wall 9c is that the pulp layer upon being separated from the trailing edge of bottom wall 9c and before being uncovered by the top wall 9d loses so much liquid that the pulp mash deposited on the sieve from the space 9b has not only a uniform height, but also a uniform pulp content.

The forward part of the pulp distributor means 9 takes the form of a plurality of slide members 9h which are substantially wedge-shaped in cross section in a manner similar to the cross section of an airplane wing. These members 9h may be made of beech wood and are connected to the wall 9e by the steel spring members 9i so that the members 9h are free to move in a substantially vertical direction so as to adapt themselves to any unevenness of the top face of sieve 7. These forward members 9h slide along the top face of sieve 7 to clean the latter and prevent the apertures thereof from becoming stopped up, and these members 9h simultaneously serve, as a result of their wedge shape and inclined top faces, to move the distributor 9 beneath the column of pulp mash in the tower and raise the latter upwardly along the tower.

The pulp distributing means of the invention may also take the form illustrated in Fig. 5 according to which the rear free opening through which the pulp passes onto the sieve 7 is adapted to have its size regulated by a flap 9k extending along the length of the distributor 9 and being turnably connected to the rear edge of top wall 9d for movement about the horizontal axis 91 which extends transversely to the axis of the shaft 3. The inclination of the flap 9k for regulating the size of outlet passage of the distributor 9 may be adjusted through the medium of a linkage 9m connected to the flap 9k for turning the same about the axis 91, this linkage 9m having a rod extending upwardly through the interior of shaft 3 and beyond the latter where this rod is associated with a means for fixing its elevation located on the outside of the tower so that the position of the rod and therefore the flap 9k may be set by the operator and visible to him.

In this way it is not only possible to make the position of the flap adjustable and known to the operator, but also by coupling this rod to the drive of the pump which feeds pulp to the distributor 9 it is possible to automatically adjust the output of this pump in accordance with the required amount of pulp mixture adapted to pass through the passage size determined by the position of flap 9k. Also, it is possible to suppress vibrations of the flap 9k by connecting a suitable damping apparatus to the adjusting linkage connected to the flap 9k. In this way the flap 9k guarantees that the distributor will not, for example, distribute layers which are too thin as the result of an improper setting of the pump at too low a pumping pressure or because of an insufficient filling of the distributor.

In order to provide an automatic control for the pump feeding pulp to the distributor 9, the latter is provided with a pressure-sensitive control mechanism 53 shown in Fig. 5 and illustrated on an enlarged scale in Fig. 6. This pressure-sensitive device includes the housing 53a which is tubular and threaded into an opening formed in the top wall 9d of the distributor 9. At the top face of top wall 9d, the housing 53a is closed by a flexible rubber membrane 53b and at the bottom face of top wall 9b, the housing 53a is closed by the flexible rubber membrane 53c which, in the particular example illustrated, is of a smaller diameter than the membrane 53b. These membranes are connected to each other by the rod 53d extending through the inner space of housing 53a and being fixedly connected to the inner faces of the membranes. The ratio between the diameters of these membranes is chosen so as to be inversely proportioned to the ratio between the pressure of the pulp column bearing against membrane 53b and the pressure of the pumped pulp moving through the space 9b and bearing against the membrane 53c. If, for example, the tower is designed to operate with a pump pressure which is 10% greater than that of the pulp column, then the diameter of the top membrane 53b is made 10% greater than that of the bottom membrane 53c. With this arrangement the apparatus operates normally with a pump pressure which is 10% higher than the pressure of the pulp column. The electrical contact 53e connected to the rod 53d then remains in the neutral position shown in Fig. 6. With a variation in this relation between the pump pressure and mash column pressure, the membranes will be stressed to move the rod 53d and contact 53e therewith up or down to engage either the upper electrical contact 53f or the lower electrical contact 53g so that an electrical circuit connected to the contacts may have the current thereof moved in one direction or another to control the pulp pump, for example, through a relay control of an electric or oil motor and in this way automatically provide the necessary change in the pump pressure.

According to the embodiment of Figs. 2–4 the members 9h are resiliently connected by strips 9i to the pulp distributor for free movement in a substantially vertical direction. According to Fig. 5, instead of the resilient connection of members 9h to the distributor 9, the forward members 9n of wedge-shaped cross section are provided with rear end portions 9o of cylindrical cross section which are turnably located in a mating cylindrical cutout formed in the front wall 9e which closes the space 9b, these members 9n being located beside each other along the distributor 9 and being continuously pressed against the sieve 7 by the wedging action with which these members move beneath the pulp column. The members 9n obviously are capable of moving in a substantially vertical direction to adapt themselves to any unevenness of the sieve 7.

The pulp from which the juice has been extracted gathers at the top portion of the tower and is limited in its upward movement by the sieve 8. This pulp is engaged by the ejector arms 11, turning with the shaft 3, to be moved thereby to the discharge apparatus 14 located at the side of the tower and communicating with the interior thereof through a side opening in the cylindrical body member 1, as is evident from Fig. 1. The details of these ejector arms are illustrated in Fig. 7 which shows how these ejector arms are provided with a transversely curved knife-like cross section while being curved rearwardly, with respect to the direction of rotation of shaft 3, as they approach the wall of the cylindrical body 1. Therefore the pulp particles located near the shaft 3 are moved during rotation of the arms 11a toward the wall of the cylindrical body 1 and into the discharge apparatus 14. The ejector 11 cuts a layer from the rising pulp column during each rotation of the shaft 3 and the arms 11a therewith.

A liquid distributing pipe 15 is arranged in the tower just above the top sieve 8 to lead a condensate to the tower for extracting sugar from the topmost layers of pulp. As a result, the space over the sieve 8 is heated with a slight vapor. Air is removed from this space through a pipe 16 communicating with the same and located at the top of the tower, and the passage through the pipe 16 is controlled by the valve 17. In this way any possibility of froth formation in the tower is avoided.

The spraying of liquid onto the topmost pulp layer must be very carefully carried out. For example, a spraying carried out by nozzles would not be suitable because with such an apparatus a uniform distribution of the liquid could not be obtained, and every place having an oversupply of liquid would necessarily produce a corresponding place provided with a deficiency of liquid. Such a poor liquid distribution would result in variations of the extent of sugar extracted from the pulp and, therefore, in a loss of sugar. The liquid distributing apparatus according to Figs. 8–10 prevents any lack of uniformity in the distribution of the liquid because this liquid falls from the stationary pipe 15 into an annular trough 15a connected to the shaft 3 for rotation therewith and emptying into the tube 15b which in turn empties into a sector-shaped box 15c fixed to the shaft 3 for rotation therewith, this box having a closed top wall and a uniformly perforated bottom wall 15d through which the liquid in the box 15c falls uniformly onto every part of the topmost pulp layer. In order to prevent the liquid, usually water, from running radially along the bottom face of bottom wall 15d, the strips 15e are provided at this bottom face and are fixed to the bottom wall 15d in a closely spaced relation between the openings thereof, as is evident from Fig. 10.

To extract sugar from the central and lower pulp layers, the pipe 18 (Figs. 1 and 11) is supplied with a water, under pressure and free of pulp, which moves through the header 19, communicating with pipe 18 and mounted on the cylindrical body 1 about its axis, and from header 19 into the tubular distributor 20 which distributes the liquid under pressure to the pulp column in the tower. This distributor 20 takes the form of a plurality of substantially radially extending pipes 20a which are fixed to and stationary with the cylindrical hollow body 1, these pipes 20a having a streamlined cross section, as is shown in section in Fig. 1, so that they provide the lowest possible resistance to the upwardly moving pulp column. Each pipe 20a is provided with a number of openings distributed along its length so that the water passes from these pipes into the pulp column in the manner indicated by the arrows of Fig. 11.

The stationary arms 20a serve the further purpose of preventing rotation of the entire mash column in the tower. The stirring arms 10 are located beneath the stationary arms 20, and these arms 10 in the embodiment of Fig. 1 have a cross section similar to that of an airplane wing, as is shown at 10a in Fig. 1. The arms 10 cooperate with the arms 20 to move the pulp particles, simultaneously with their vertical movement, through circular paths concentric with the shaft axis so as to change the positions of the pulp particles with respect to each other. In this way the extraction of sugar from the individual pulp particles is accelerated without in any way changing the horizontal position of the pulp layers in the tower. The stirring arms 10 thus produce, at the elevation at which they are located, a loosening up of the matted pulp particles so as to improve the juice extracting process. Thus, the arms 10 form a plurality of blade means for loosening the mash without substantially raising the same.

A stirring arm construction which is capable of serving this purpose in a special way is shown in Figs. 12 and 13. This arm extends radially from the shaft axis and is in the form of a relatively thick-walled tube 10b which is fixed to the shaft 3 for rotation therewith. A plurality of curved rods or tubes 10c are fixed, as by welding, to the top face of the tube 10b and extend downwardly at their portions located in front of the tube 10b and also extend rearwardly beyond the tube 10b, as is evident from Fig. 12, Fig. 13 showing how the rods 10c are spaced from each other along the length of the tube 10b. In order to improve the connection between the pipes or tubes 10c and the tube 10b, a plurality of vertically extending plates 10d are welded to the tube 10b and are joined symmetrically at their top edges, respectively, to the rods 10c to which they are also welded, these rods 10c extending freely at the rear of the tube 10b. The plates 10d serve the further purpose of preventing movement of the pulp column radially with respect to the shaft axis during upward movement of the pulp column.

In the event that the operation is stopped for any length of time, an exceedingly large amount of power would be required to start the rotation of the shaft 3 because the arms 10b would have to start moving through a stationary pulp column. In order to reduce the amount of power required to start the rotation of the arms 10b under these conditions, the latter are joined to a conduit 10e which communicates with the interior of tube 10b and is supplied with a liquid under pressure which flows through the openings 10f formed in the tube 10b and located respectively between each pair of plates 10d, as is evident from Fig. 13. As is evident from Fig. 13, the openings 10f increase in size as their distance from shaft 3 increases, so that each space between a pair of adjacent plates 10d is provided with amount of liquid which is proportional to its distance from the turning axis. The rods or tubes 10c as well as the plates 10b are curved along their length and are concentric with the turning axis of shaft 3.

As was mentioned above, the turning arms or blade means 10 serve to loosen up the matted pulp layers without substantially raising the same, and the stationary arms 20 located thereover prevent the pulp from moving radially with respect to the shaft axis so that in this way the pulp is limited to a vertical movement through the tower and a greater amount of pulp cannot become concentrated at the wall of the cylindrical body 1, for example, than at the shaft 3. It is particularly advantageous to arrange the arms 10 and 20 at a distance of 3 meters from each other in the tower, as is shown in Fig. 14 where a plurality of alternating sets of arms 10 and 20 are shown located over each other at this distance of 3 meters between each set of arms 10 and 20, this arrangement also being shown in Fig. 15 and in plan view in Fig. 16. The pulp column of the tower is divided up in this way and the top layer of each portion of the pulp column is loosened up by the turning arms 10. Behind these arms 10, a turbulence is produced which causes the pulp particles to move about and breaks up the film of liquid located about each particle of pulp. As soon as the pulp particles rise to the elevation of the stationary arms 20, they are restricted to a purely vertical movement upwardly along the tower. Because of the loosening of the matted pulp particles and the changes in the position thereof, a very effective juice extraction takes place in the region of the stationary arms 20.

It is important to prevent shifting of the pulp toward the wall of the cylindrical body 1 during engagement of the pulp with the turning arms 10. According to Figs. 14–17, this undesirable result is avoided by special construction of the turning arms which guarantees that the pulp column continuously and uniformly moves upwardly at all parts of its cross section. For this purpose each arm 10 is divided into a plurality of arcuate segments 10g which are concentrically curved about the shaft axis. The several segments 10g are separated from each other by the arcuate guide ribs 10h which are fixed to the top face of each arm 10, extending upwardly therefrom, and are respectively located between each pair of adjacent arcuate segments. For the sake of clarity these guiding ribs are not shown in Fig. 17. The forward edge 10i of each arcuate segment is located along a line which extends radially from the shaft axis. Each of the arcuate segments of the arm 10 has an inclined surface which is limited at the top by a plate 10k which is horizontal. The angles of these inclined surfaces are equal to each other and are smaller than the slipping angle of the pulp mash at the corresponding juice temperature so that the pulp mash will have no tendency to slip downwardly along the arcuate segments. The arcuate segments are carried by the tubes 10b (Fig. 16) which are fixed to the shaft 3 for rotation therewith. A vertically extending side plate 101 is provided on each rotating arm 10, and the lower edge of the plate 101 extends horizontally while its rear edge extends upwardly to the plate 10k along a curved or straight line which makes an angle of between 15° and 30° with the vertical, the plates 101 also being curved and concentric with the shaft axis (Fig. 17). In this way the individual pulp particles are moved with respect to each other behind the arms 10, and a vertical movement of the pulp is simultaneously produced.

The structure of arms 10 which is shown in solid lines in Fig. 16 may also take the form shown in dotted lines in Fig. 16 according to which all of the forward edges of the segments together form a single straight line. With this arrangement all of the inclined portions 10g would also have the same inclination.

The same principle which is applied to the construction of arms 10 may be applied to the mash distributor 9. Such a mash distributor 9 is shown in cross section in Fig. 14, in perspective in Fig. 15, and in plan view in Fig. 16. The object is to avoid radial movement of the pulp during rotation of the distributor to raise the pulp. The top surface of the distributor is divided into a number of arcuate segments 9p concentric with the shaft axis and separated from each other by the guiding ribs 9q which are located on the top surface of the distributor, extend upwardly therefrom, and are also concentric with the shaft axis. Each segment is provided at its front end with a turnably mounted slide member 9n, as was described above in connection with Fig. 5, and these members have a top surface which is inclined to the horizontal at an angle of approximately 25°, each of these members 9n having a front edge 9r which extends radially from the shaft axis. The difference between the several radial distances $r_1$–$r_5$ is so chosen with respect to each other that the difference, for example, between the radii $r_1$ and $r_2$ has in relation to the difference between the radii $r_2$ and $r_3$ a value corresponding to the central distance of the inclined surface so that the deepening of the members 9n takes place continuously.

A further embodiment of the turning arms 10 and the stationary arms 20 associated therewith is illustrated in Figs. 18–24. According to this embodiment the turning arms advantageously produce an acceleration in the juice extracting process. This embodiment is based on the principle that the pulp column forms a matted mass which could, if desired, be carried by a suitable meshwork. If the pulp column rested on such a mesh, then an acceleration of the juice extraction from the pulp particles could be produced by taking advantage of the pressure of the pulp column located over the individual pulp particles. Such an action cannot be attained with the above described turning arms 10, particularly those shown in Figs. 14–17, because the rearwardly extending wall 10k is impassable to juice.

According to Figs. 18–24, the rearward part of each arm 10 is constructed to carry the pulp column while enabling juice to move downwardly through the same, this rearward part of each arm 10 taking the form of a number of rods 10m, of any desired cross section, which are spaced from each other and are curved so as to be concentric with the shaft axis. As is shown in Fig. 20, the arm 10, made up of several arcuate segments, is fixed to the shaft 3 for rotation therewith and has a rear wall 10n from which the several rods 10m extend rearwardly. These rods 10m can have any desired cross section such as, for example, a round, oval, drop-shaped, triangular or T-shaped cross section, several of which are shown in Figs. 21–24. It is advantageous to make the top surface of the rods 10m convexly curved and merging smoothly into the opposite rounded sides of the rods so that the pulp particles are not injured by these rods 10m.

The pulp, since it forms a matted mass, rests on the rods 10m without falling through the spaces between the rods 10m. The pressure of the pulp column acting on the individual pulp particles presses the juice out of the cells of the pulp, and this juice is free to move downwardly through the spaces between the rods 10m.

Experiments have proved that juice obtained in this way has a thickness which approaches that of the juice in the pulp cells. The sugar loss is so low that it is more than 50% less than the sugar loss occurring in known juice extracting processes.

Figs. 18 and 19b show how the straight vertical walls or rods 20a extend inwardly from the cylindrical hollow body 1, are fixed thereto, and are located above the arms 10. These members 20a are not quite radial with respect to the turning axis because they are advanced slightly with respect to the direction of rotation as they approach the turning axis. The members 20a are fixed at their inner ends to a ring 20b which slidably engaged the outer surface of the shaft 3. In the space between the shaft 3 and the wall of the cylindrical body 1, one or more annular rings 20c, depending on the diameter of the tower, are concentrically arranged with respect to the turning axis and are fixed to the members 20a, these rings 20c being made of a vertically extending plate material, for example. In this way the pulp mass cannot turn as result of any movement imparted to it by the arms 10, and also the pulp mass cannot shift outwardly toward the wall 1, the members 20a, 20b and 20c limiting the movement of the cells in all horizontal directions so that the pulp column can only move vertically.

As is evident from Fig. 18, the pairs of arm sets 10 and 20 are arranged at relatively great distances from each other in the tower. The topmost set of stationary arms 20 is located directly beneath the three-armed pulp ejector 11 whose arms are bulged against the direction of rotation and form hollow knife-like blades. In this way the above-described high degree of juice extraction is obtained.

The liquid moving downwardly through the tower in counter current to the upwardly moving pulp flows through the seive 7 into the chamber 21, formed between the sieve 7 and conical floor 2, with a relatively high concentration of juice. The chamber 21 may be divided into separate zones by annular plates arranged concentrically with the shaft axis, and these plates may be regulated from the outside of the tower to control the flow of liquid to the outlet tube 22, so that in this way the sugar extracting process taking place in the tower may be influenced to a certain extent.

As is shown in Fig. 1, the juice drawn off from the tower through the tube 22 moves into an elongated compensating tube 23 which extends along the length of the tower at the exterior thereof and communicates with the tube 22. The flow of juice may be regulated by this compensating tube 23 together with a stationary stand pipe 23a located therein and extending up to approximately the central elevation of the tower, while the compensating tube 23 extends up to the elevation of the ejector 11. A pipe 23b is located in the stand pipe 23a, for slidable translational movement therein, and this pipe 23b is threadedly connected to a threaded spindle which extends beyond the top of the compensating tube 23 where a hand wheel 23d is located in threaded engagement with the spindle 23c to move the latter up and down and in this way also move the pipe 23b vertically in the stationary stand pipe 23a. This pipe 23b is formed with a side opening 23e through which juice enters from the compensating tube 23 and flows downwardly along the pipe 23b into the pipe 23a and leaves the tower at 24 (Fig. 1). In this way it is possible to control the amount of liquid moving through the tower and to limit the sugar content remaining in the pulp to a desired extent.

A further apparatus for accelerating the juice extracting process in the tower and for increasing the amount of sugar extracted may take the form of a steam vibrator shown in Fig. 28. This steam vibrator may be located on the wall of the cylindrical body 1, on the shaft 3, on the arms 10, or the arms 20, or any place where it may communicate with the inner space of the tower. The osmosis and extraction process takes place after the pulp has been brought to the state of plasmolysis. In this way the little pockets of the pulp cells which contain the juice are uncovered. With mechanical power, such as that provided by certain types of presses, a minimum residue of 3% of the sugar content of the pulp always remains therein even though extremely high pressures are used. In contrast to this, the pulp cells may be vibrated with a steam vibrator such as that shown in Fig. 28, for example, so that the vibration of the cells may closely approach the frequency of their natural vibrations. In this way the juice extracting process is accelerated, and an increase in the tower output is obtained. The steam vibrator must be constructed so that it operates at the most efficient frequency which can be determined empirically for each installation, and a tuning fork may be used to determine the best possible frequency. With such a steam vibrator it is possible to obtain extremely violent vibrations of the large liquid mass in the tower and the frequency can be very easily changed. This result can be produced through different adjustments of the steam pressure nozzle size and temperature of the vibration apparatus either by hand regulation or by automatic regulation.

The vibrator 54 shown in Fig. 28 includes a very thick-walled housing 54a having a parabolic inner space 54b. A nozzle 54c is located at the focal point of the parabolic space 54b, and a needle valve 54d controls the outlet of the nozzle 54c. This valve 54d may be adjusted by the hand wheel 54e so as to regulate the cross section of the nozzle. A pipe 54f is formed integrally with the housing 54a and is provided with a passage 54g leading into the nozzle. This passage 54g communicates with a steam supply. The housing 54a includes two further pipes 54h and 54i which are integral therewith and which are respectively provided with the passages 54k and 54l communicating with the interior of the housing 54a. The pipe 54h is connected to a source of cool water which reacts with the steam to produce the vibrations in the space 54b, and the pipe 54i serves as an outlet for the liquid and vapor in the space 54e. Return water or other liquid of the extracting process may be used as the cooling liquid, such as, for example, the water not converted into steam fed through the nozzle, so that the water derived from the pipe 54i may be used in the tower.

The parabolic space 54b is separated from the interior of the tower by a membrane 54 which may be made of caoutchouc, metal, or an alloy of caoutchouc and metal, so as to avoid scorching of the pump. The vibrations of the membrane 54 is transmitted to the contents of the tower which engages the membrane 54 so that a great improvement in the juice extracting process results. The vibrator is preferably located at a part of the tower where the pulp has a low sugar content so that the last stage of the juice extraction process takes place with the best possible efficiency.

The tower operates as follows:

The pulp mash is introduced, in a state of plasmolysis, into the tower at 12 (Fig. 1) and is distributed by the rotating pulp distributor 9 into the tower in a layer of uniform height, a pump being used to move the pulp to the distributor 9. This pulp pump operates at a pressure which is somewhat higher than the static pressure of the pulp column in the tower but this pump pressure is too small to enable the freshly introduced pulp to break into the matted mass of pulp located in the pulp column thereover. In this way a rate of pulp flow into the tower which is just sufficient to fill the free space formed behind the distributor 9 during its rotation is assured. The rotating pulp distributor raises the pulp column by means of the wedge-shaped members 9h which slide along the sieve 7, and the pressure of the pulp column on the members 9h cause the latter to engage the sieve 7, so that the latter is continuously cleaned during rotation of the distributor. As soon as the pressure of the pulp column presses against the fresh pulp mash remaining behind the distributor, this remaining pulp mash loses a part of its liquid content which then flows through sieve 7 into chamber 21. The pulp layers which are thus introduced into the tower continually move in a vertical direction upwardly through the same and contact the juice extracting liquid introduced into the tower by the liquid distributors 15 and 20. Since the liquid at each part of the tower has a lesser sugar concentration than the sugar content of the pulp located in this liquid, an intensive extraction takes place at each part of the tower so that the juice exracting liquid at the bottom of the tower comes into contact with the fresh mash having the greatest sugar content of the mash in the tower and flows with a high sugar concentration into the chamber 21 through the sieve 7. The ejector 11 removes from the tower an amount of pulp mash which coresponds to that introduced into the tower, and the conveyor 14 carries the pulp away from the ejector 11. In order to be able to influence the time of the treatment in the tower, the speed of revolution of the distributor 9 may be regulated. The pulp layers moving upwardly through the tower do not move in a radial direction. The turning arms 10 merely change the positions of the pulp particles with respect to each other in order to bring different surface portions of the pulp particles into contact with the extracting liquid. Simultaneously, the arms 10 loosen up the pulp layers located thereunderneath and press against the pulp layers located thereover so as to improve the juice extracting process.

The high percentage of juice extraction is increased in accordance with the invention by introducing the pulp into the tower in a state of full plasmolysis, and in this way it is also possible to reduce the volume of the tower. With known heating vats the liquid flows in the same direction as the pulp so that these known vats require a large heating time and can not maintain the pulp mash at approximately 80° C. at the vat outlet. Higher temperatures are not suitable because at higher temperatures the pulp becomes scalded with resulting injury to the cell walls which renders the pulp unsuitable for juice extraction.

The heating vat illustrated in Figs. 25 and 26 enables the desired results to be produced with a structure of small size and in a relatively short heating time. This heating vat includes a substantially cylindrical closed housing 25 in which a hollow closed worm shaft 26 is located, this shaft 26 extending horizontally in the housing 25 and being supported for rotation about its own axis on the end walls 27 and 28, the axis of shaft 26 coinciding with that of the housing 25. At the inlet and outlet portions of the housing, the pipe 26 carries the stirring arms 29 and 30, respectively, and between these arms a worm 31 is fixed to the hollow shaft 26. The outer ends of the arms 29 and 30 are located at approximately the same radial distance from the axis of shaft 26 as the outer edge of the worm 31, and this radial distance is somewhat smaller than the radius of the housing 25. There is thus provided an annular substantially cylindrical space between the members 29—31 and the wall of housing 25, and a plurality of strips 25a are located in this space, extend horizontally along the length of the housing, are fixed to the housing wall, and serve the purpose of preventing the mash introduced into the heating vat from participating in the rotation of the worm 31. Known stop devices could produce the same results by extending into part of the space between the worm thread. The length of the heating vat is divided up into sections A, B, and C in which the stirring arm 29, worm 31, and stirring arms 30 are respectively located.

The housing 25 is provided with a bulged extension 25a in which a tubular cylindrical sieve 32 is located, this sieve 32 being provided in its interior with a partition 32a (Fig. 25) which divides the interior of sieve 32 into two chambers 32b and 32c, the sieve 32 being turnably carried for rotation about its axis on the end walls 27 and 28 of the heating vat. In order to continuously clean the sieve 32, the scraper members 33 are provided, and these members 33 are mounted in the vat for free substantially vertical movement and are pressed downwardly against the sieve wall by the weights 33a respectively mounted on the scrapers 33, although it is also possible to provide springs for urging the scraper members 33 against the sieve 32 so as to continuously clean the latter during rotation thereof. A pipe 34 communicates with the interior of the vat housing 25 to remove air therefrom, and a valve 35 is carried by the pipe 34 to regulate the passage of fluid through the latter. Pulp, which is carried by a liquid of high juice content and which is preheated, is washed into the vat housing through the inlet 36 and is converted into an approximately 35% uniform mash in the vat section A by the stirring arms 29, and this mash is then engaged by the worm 31. A sufficient pulp is introduced into the vat to maintain the spaces between the turns of the thread of worm 31 filled with mash at all times during operation of the apparatus. The worm 31 moves the mash through the section B of the vat into the section C where it is engaged by arms 30 and moves through the outlet 37 to the pulp pump 48 (Fig. 27) and into the tower.

The circulation of the juice carrying liquids in the vat and the connections between the latter and the tower and remaining parts of the apparatus is schematically illustrated in Fig. 27. The juice carrying liquid which leaves the tower at 24 flows through the conduit means 38 to the pipe 39 leading into the vat at section C thereof. The pulp mash located in this section of the vat has a higher sugar content than the pulp in the tower. This liquid from the tower moves through section C of the vat in a direction transverse to the direction of movement of the pulp mash toward the end wall 28, and a certain portion of the sugar content of the pulp is given up to this liquid moving through section C. The thus enriched liquid moves into the right-hand portion of chamber 32c of the sieve 32, and moves out of the sieve through the pipe 32d which simultaneously serves as a shaft turnably supporting the sieve 32, on the wall 28 of the heating vat.

This pipe 32d is slidably and sealingly connected to the conduit 41 which conveys the liquid to the pump 40 which acts to draw the liquid through part C of the heating vat and through the sieve 32 along the pipes 32d and 41, the pump 40 then moving this liquid through the heater 42 and into the conduit 43. The greater portion of this liquid moves at a temperature of about 80° C. through the conduit 44 to the pipe 45 feeding into the central section B of the vat, and this liquid then moves through the mash at the worm 31 in a direction transversely to the movement of the mash toward the end wall 28 so that an amount of liquid approximately 6 to 8 times the amount of pulp flows through this portion of the vat. This liquid then enters the chamber 32c of the sieve 32 and is again drawn through pipes 32d and 41 into the pump 40.

The remaining part of the liquid moved into the conduit 43 by the pump 40 moves through a second heater 46 and along the conduit 47 to the inlet 36 to be mixed with fresh pulp at a temperature of approximately 10° C. located therein and to be washed with this pulp into the vat through the inlet 36. This liquid which is introduced through inlet 36 together with the fresh pulp moves through the section A of the vat transversely to the direction of movement of the pulp to the worm 31 and flows into the chamber 32b of the sieve 32 from which the liquid then flows through the hollow pipe 32e which simultaneously serves as a shaft for turnably supporting the sieve in the left end wall 27 of the vat housing 25, as is evident from Fig. 25, this pipe 32e serving to carry away the raw juice provided by the apparatus and process of the invention. Thus, the richest liquid, with the exception of that carried off by pipe 32e, is mixed with the fresh pulp and moves through the same to become further enriched to provide the final product of the process and apparatus of the invention. The pulp mash which leaves the vat in the state of plasmolysis through the tube 37 is drawn by the pump 48 and moved by the latter through a pressure regulator 49 and a conduit 50 to the location 12 from which it is introduced through the pipe 13 into the tower, as was described above.

It is evident that the process and apparatus of the invention may take many different forms. For example, it is possible to charge the tower through the shaft 3 and in this way avoid the necessity for a seal at the connection between the shaft 3 and distributor 9. In this case the pulp pump would be controlled by a valve located within the shaft 3 and the control would be made dependent on the pressure of the pulp column so that an efficient filling of the distributor 9 would be assured. It is also possible to locate the vat 25 at a high enough elevation to do away with the necessity for a pulp pump.

The tower can be very easily emptied after the sugar extraction process by removing the cover 52 (Fig. 1). The opening of the tower which is covered by the removable cover 52 is located at the elevation of distributor 9 so that the latter may be rotated to cooperate with a stream or spray of water to eject the contents of the tower out through this opening, the pulp then flowing to any suitable sump or pump or the like.

It is also possible to eliminate a drive for the pulp distributor by making the pressure of the pulp introduced into the tower great enough to move the distributor by reaction therewith against the friction between the distributor and the sieve 7.

It is also possible to increase the number of times the liquid passes through the heating vat by arranging a number of pumps to cooperate with several additional chambers formed by additional partitions in the cylindrical sieve 32 at the central part of the heating vat.

It will be understood that each of the elements described above, or two or more together, may also find a useful application in other types of apparatus and process for extracting juices from fruits or vegetables differing from the types described above.

While the invention has been illustrated and described as embodied in apparatus and process for extracting sugar from beets and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same; a plurality of blade means for loosening the mash without substantially raising the same, said blade means extending substantially radially from said shaft, being fixed thereto, and being located at a predetermined elevation in said cylindrical body over said distributing means to move through a mash at said elevation during rotation of said shaft; and a plurality of arms located in said cylindrical body at a predetermined elevation over said blade means, extending substantially radially toward said shaft axis, and being fixed to and stationary with said cylindrical body to prevent rotation of the mash column in said cylindrical body.

2. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means fixed to said shaft for rotation therewith, being located directly over said sieve, and having a front edge portion of substantially wedge-shaped cross section engaging said sieve to clean the same, said distributing means having an outer curved side wall extending rearwardly away from said front edge portion tangentially to the wall of said cylindrical hollow body and an inner curved side wall extending rearwardly away from said front edge portion tangentially to the wall of said hollow shaft, and said distributor means having a bottom wall extending between said inner and outer side walls and located next to said sieve and a top wall extending between said side walls and located over said bottom wall in spaced relation thereto, said side walls and top and bottom walls defining an outlet of the distributing means and said bottom wall having a trailing edge which is curved to deliver from said distributor means a mash having a uniform pulp content; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; and a plurality of second arms located in said cylindrical body at a predetermined elevation over said first arms, extending substantially radially toward said shaft axis, and being fixed to and stationary with said cylindrical body to prevent rotation of the mash column in said cylindrical body.

3. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge in the form of a plurality of members of wedge-shaped cross section located beside each other, being connected to the distributor means for free movement in a substantially vertical direction, and engaging said sieve to clean the same; a plurality of blade means for loosening the mash without substantially raising the same, said blade means extending substantially radially from said shaft, being fixed thereto, and being located at a predetermined elevation in said cylindrical body over said distributing means to move through a mash to said elevation during rotation of said shaft; and a plurality of arms located in said cylindrical body at a predetermined elevation over said blade means, extending substantially radially toward said shaft axis, and being fixed to and stationary with said cylindrical body to prevent rotation of the mash column in said cylindrical body.

4. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge in the form of a plurality of members of wedge-shaped cross section located beside each other, being resiliently connected to the distributor means for free movement in a substantially vertical direction, and engaging said sieve to clean the same; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; and a purality of second arms located in said cylindrical body at a predetermined elevation over said first arms, extending substantially radially toward said shaft axis, and being fixed to and stationary with said cylindrical body to prevent rotation of the mash column in said cylindrical body.

5. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means fixed to said shaft for rotation therewith, being located directly over said sieve, and having a front edge portion of substantially wedge-shaped cross section engaging said sieve to clean the same, said distributing means having an outer curved side wall extending tangentially from the wall of said cylindrical hollow body and an inner curved side wall extending tangentially from the wall of said hollow shaft, and said distributor means having a bottom wall extending between said inner and outer side walls and located next to said sieve and a top wall extending between said side walls and located over said bottom wall to form with the latter and with said side walls a free rear opening through which mash moves from said distributor means onto said sieve during rotation of said distributor means with said shaft, and a flap hingedly connected to said top wall for turning movement about an axis extending transversely to said shaft axis to regulate the size of said rear opening of said distributor means; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; and a plurality of second arms located in said cylindrical body at a predetermined elevation over said first arms, extending substantially radially toward said shaft axis, and being fixed to and stationary with said cylindrical body to prevent rotation of the mash column in said cylindrical body.

6. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means fixed to said shaft for rotation therewith, being located directly over said sieve, and having a front edge portion of substantially wedge-shaped cross section engaging said sieve to clean the same, said distributing means having an outer curved side wall extending tangentially from the wall of said cylindrical hollow body and an inner curved side wall extending tangentially from the wall of said hollow shaft, and said distributor means having a bottom wall extending between said inner and outer side walls and located next to said sieve and a top wall extending between said side walls and located over said bottom wall to form with the latter and with said side walls a free rear opening through which mash moves from said distributor means onto said sieve during rotation of said distributor means with said shaft, and a flap hingedly connected to said top wall for turning movement about an axis extending transversely to said shaft axis to regulate the size of said rear opening of said distributor means, the latter including a linkage connected to said flap for adjusting the position thereof and adapted to extend through said hollow shaft to the exterior of the tower so as to be accessible to the operator; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; and a plurality of second arms located in said cylindrical body at a predetermined elevation over said first arms, extending substantially radially toward said shaft axis, and being fixed to and stationary with said cylindrical body to prevent rotation of the mash column in said cylindrical body.

7. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means fixed to said shaft for rotation therewith, being located directly over said sieve, and having a front edge portion of substantially wedge-shaped cross section engaging said sieve to clean the same, said distributing means having an outer curved side wall extending tangentially from the wall of said cylindrical hollow body and an inner curved side wall extending tangentially from the wall of said hollow shaft, and said distributor means having a bottom wall extending between said inner and outer side walls and located next to said sieve and a top wall extending between said side walls and located over said bottom wall to form with the latter and with said side walls a free rear opening through which mash moves from said distributor means onto said sieve during rotation of said distributor means with said shaft, and a flap hingedly connected to said top wall for turning movement about an axis extending transversely to said shaft axis to regulate the size of said rear opening of said distributor means, the latter including a linkage connected to said flap for adjusting the position thereof and adapted to extend through said hollow shaft to the exterior of the tower so as to be accessible to the operator; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; a plurality of second arms located in said cylindrical body at a predetermined elevation over said first arms, extending substantially radially toward said shaft axis, and being fixed to and stationary with said cylindrical body to prevent rotation of the mash column in said cylindrical body; and pump means operatively connected to said distributor means for supplying a pulp mash thereto, said pump means being adapted to be connected to said linkage of said distributor means to be regulated thereby.

8. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, having a body portion formed along its front face with a groove of substantially cylindrical cross section, and having a front edge portion in the form of a plurality of members of wedge-shaped cross section located beside each other and each having a cylindrical rear end portion slidably located in said groove to connect said members to said distributor means for free movement in a substantially vertical direction, said members engaging said sieve to clean the same; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; and a plurality of second arms located in said cylindrical body at a predetermined elevation over said first arms, extending substantially radially toward said shaft axis, and being fixed to and stationary with said cylindrical body to prevent rotation of the mash column in said cylindrical body.

9. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same; a plurality of first arms extending substantially radially from said shaft, being fixed thereto, and being located at a predetermined elevation in said cylindrical body over said distributing means to move through a mash to said elevation during rotation of said shaft for loosening up said shaft without raising the same, each of said first arms having a streamlined cross section and being each inclined to the plane of their rotation around said shaft; and a plurality of second arms located in said cylindrical body at a predetermined elevation over said first arms, extending substantially radially toward said shaft axis, and being fixed to and stationary with said cylindrical body to prevent rotation of the mash column in said cylindrical body.

10. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same; a plurality of first arms extending substantially radially from said shaft, being fixed thereto, and being located at a predetermined elevation in said cylindrical body over said distributing means to move through a mash to said elevation during rotation of said shaft for loosening up said mash without raising the same, each of said first arms having a streamlined cross section and being each inclined to the plane of their rotation around said shaft, and each of said first arms being divided into arcuate segments concentric with said shaft axis and being separated by arcuate ribs located on the top face of said arm and also being concentric with said shaft axis, and each of said arms having a plurality of elongated arcuate members spaced from each other, extending rearwardly from said segments thereof and all being concentric with said shaft axis; and a plurality of second arms located in said cylindrical body at a predetermined elevation over said first arms, extending substantially radially toward said shaft axis, and being fixed to and stationary with said cylindrical body to prevent rotation of the mash column in said cylindrical body.

11. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; and a plurality of second arms located in said cylindrical body at a predetermined elevation over said first arms, extending substantially radially toward said shaft axis, and being fixed to and stationary with said cylindrical body to prevent rotation of the mash column in said cylindrical body, said second arms each being advanced in the direction of rotation of said first arms as said second arms approach said shaft axis.

12. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; a plurality of second arms located in said cylindrical body at a predetermined elevation over said first arms, extending substantially radially toward said shaft axis, and being fixed to and stationary with said cylindrical body to prevent rotation of the mash column in said cylindrical body; and a plurality of annular wall members of different diameters, respectively, concentrically located about said shaft axis and being connected to said plurality of second arms.

13. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same and having a top wall spaced from said sieve; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; a plurality of second arms located in said cylindrical body at a predetermined elevation over said first arms, extending substantially radially toward said shaft axis, and being fixed to and stationary with said cylindrical body to prevent rotation of the mash column in said cylindrical body; pump means operatively connected to said distributor means for supplying fresh mash thereto and to the space between said top wall of said distributor means and said sieve; and control means operatively connected to said pump means for regulating the same, said control means being in the form of a pressure-sensitive device located in said top wall of said distributor means for measuring the difference between the pressure of the fresh mash pumped to said distributor means and the pressure of the mash column located over said distributor means in said hollow cylindrical body.

14. In an extraction tower for extracting juices from fruits or vegetables, in combination, an elongated cylindrical hollow body having a top end portion toward which a pulp mash of the material from which juices are to be extracted is adapted to move; a sieve located in said cylindrical body adjacent the bottom thereof and extending transversely to the axis thereof; an elongated hollow shaft mounted for rotation about its own axis in said cylindrical body, said shaft axis coinciding with the axis of said cylindrical body; drive means connected to said shaft for rotating the same about its axis; mash distributing means having a rear mash outlet and being fixed to said shaft for rotation therewith, being located directly over said sieve, and having a front edge portion of substantially wedge-shaped cross section engaging said sieve to clean the same and having a top wall spaced from said sieve; a plurality of first arms extending substantially radially from said shaft, being fixed thereto, and being located at a predetermined elevation in said cylindrical body over said distributing means to move through a mash to said elevation during rotation of said shaft for loosening up said mash without raising the same; a plurality of second arms located in said cylindrical body at a predetermined elevation over said first arms, extending substantially radially toward said shaft axis, and being fixed to and stationary with said cylindrical body to prevent rotation of the mash column in said cylindrical body; pump means operatively connected to said distributor means for supplying fresh mash thereto and to the space between said top wall of said distributor means and said sieve; and control means operatively connected to said pump means for regulating the same, said control means being in the form of a pressure-sensitive device located in said top wall of said distributor means for measuring the difference between the pressure of the fresh mash pumped to said distributor means and the pressure of the mash column located over said distributor means in said hollow cylindrical body, said pressure-sensitive device comprising a top flexible membrane located at the top surface of said top wall of said distributor means, a bottom flexible membrane located at the bottom surface of said top wall of said distributor means, said top wall of said distributor means being formed with an opening extending between said membranes, an elongated member extending through said opening of said top wall and being fixed to said membranes, an electrical contact member fixed to said elongated member for movement therewith, and a pair of additional electrical contact members located along the path of movement of said first-mentioned electrical contact member to be respectively contacted thereby during movement of said membranes registering changes in the relationship between the pressure of the mash column over said distributor means and the pressure of the freshly pumped mash located beneath said top wall of said distributor means, and said contacts being electrically connected to said pump means to regulate the same.

References Cited in the file of this patent

UNITED STATES PATENTS

| 786,154 | Rigney | Mar. 28, 1905 |
| 1,028,650 | Wolff | June 4, 1912 |
| 1,042,261 | Pashen | Oct. 22, 1912 |
| 2,195,739 | Rolston | Apr. 2, 1940 |
| 2,502,939 | Frynta | Apr. 4, 1950 |
| 2,637,666 | Langen | May 5, 1953 |

FOREIGN PATENTS

| 665,857 | Great Britain | Jan. 30, 1952 |
| 410,730 | Great Britain | Aug. 17, 1932 |
| 597,408 | France | Aug. 29, 1925 |
| 831,830 | Germany | Feb. 18, 1952 |
| 401,818 | France | Aug. 10, 1909 |